US011317324B2

(12) United States Patent
Tabet et al.

(10) Patent No.: US 11,317,324 B2
(45) Date of Patent: Apr. 26, 2022

(54) DEVICE CATEGORY IN 3GPP COMMUNICATIONS

(71) Applicant: Apple Inc., Cupertino, CA (US)

(72) Inventors: Tarik Tabet, Los Gatos, CA (US); Awais M. Hussain, Milpitas, CA (US); Lydi Smaini, San Jose, CA (US); Moustafa M. Elsayed, Los Gatos, CA (US); Syed Aon Mujtaba, Palo Alto, CA (US); Matthias Sauer, San Jose, CA (US); Ronald W. Dimpflmaier, Los Gatos, CA (US); Bernd W. Adler, Saratoga, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/590,866

(22) Filed: Oct. 2, 2019

(65) Prior Publication Data

US 2020/0037206 A1 Jan. 30, 2020

Related U.S. Application Data

(63) Continuation of application No. 15/387,904, filed on Dec. 22, 2016, now Pat. No. 10,455,454.

(Continued)

(51) Int. Cl.

*H04L 5/00* (2006.01)
*H04W 28/24* (2009.01)

(Continued)

(52) U.S. Cl.

CPC ........... *H04W 28/24* (2013.01); *H04L 5/0005* (2013.01); *H04L 5/0044* (2013.01); *H04W 8/22* (2013.01);

(Continued)

(58) Field of Classification Search

CPC ... H04W 28/24; H04W 8/22; H04W 52/0235; H04L 5/0005; H04L 5/0044; Y02D 30/70

See application file for complete search history.

(56) References Cited

U.S. PATENT DOCUMENTS 8,699,423 B1 4/2014 Anderson et al.
8,737,989 B2 5/2014 Luft (Continued)

FOREIGN PATENT DOCUMENTS

CN 101940028 1/2011
CN 102316489 1/2012

(Continued)

OTHER PUBLICATIONS

International Search Report and Written Opinion, Application No. PCT/US2016/069575, dated Apr. 6, 2017, 12 pages.

(Continued)

*Primary Examiner* — Lakeram Jangbahadur

(74) *Attorney, Agent, or Firm* — Kowert, Hood, Munyon, Rankin & Goetzel, P.C.

(57) ABSTRACT

A user equipment (UE) device may communicate according to a new device category satisfying specified QoS (quality of service) requirements while also satisfying specified link budget requirements, and/or additional optimization requirements. The UE device may communicate with a cellular base station according to a first mode of operation associated with the new device category, and may switch to communicating with the cellular base station according to a second mode of operation associated with a second (pre-existing) device category in response to the link budget requirements exceeding a specified value and the quality of service requirements not being sensitive. The UE device may also switch to communicating with the cellular base station according to a third mode of operation associated with a third (pre-existing) device type in response to the link (Continued)

budget requirement not exceeding the specified value, or the QoS requirements being sensitive and a downlink throughput requirement exceeding a specified throughput value.

20 Claims, 12 Drawing Sheets

Related U.S. Application Data

(60) Provisional application No. 62/274,353, filed on Jan. 3, 2016.

(51) Int. Cl.
*H04W 52/02* (2009.01)
*H04W 8/22* (2009.01)

(52) U.S. Cl.
CPC ......... *H04W 52/0235* (2013.01); *Y02D 30/70* (2020.08)

(56) References Cited

U.S. PATENT DOCUMENTS 9,204,289 B2 12/2015 Jang et al.
9,426,689 B2 8/2016 Himayat et al.
2010/0057485 A1 3/2010 Luft
2012/0207130 A1* 8/2012 Jang ........................ H04W 8/24 370/331
2012/0275369 A1* 11/2012 Zhang ................. H04L 12/1886 370/312
2013/0165183 A1 6/2013 Gerstenberger et al.
2013/0203455 A1* 8/2013 Takano ................. H04W 76/28 455/509
2015/0334653 A1* 11/2015 Ang .................. H04W 52/0219 370/311
2016/0112898 A1 4/2016 Chen et al.
2016/0242229 A1 8/2016 Balachandran et al.
2017/0149609 A1 5/2017 Tofighbakhsh

FOREIGN PATENT DOCUMENTS

CN 104125175 10/2014
CN 104956752 9/2015
WO WO 2015/175122 11/2015

OTHER PUBLICATIONS

ZTE on RAN enhancements for MTC in Rel-11, 3GPP TSG-RAN WG1 meeting #65 in Barcelona, Spain R1-111811. May 13, 2011(May 13, 2011) 7 Pages.

* cited by examiner

| Feature Parameters | CAT "1" | CAT "0" | CAT "M" (under discussion in 3GPP) | Cat-A |
|---|---|---|---|---|
| 3GPP Release number | Release 8 and onwards | Release 12 Low Cost | Release 3 Range Improvement | |
| Maximum Throughput | TBS 10000<br>TBS 5000 | Data: TBS 1000<br>Control: TBS 2200 | Data: TBS 1000<br>Control: TBS 2200 | TBS 10000 DL<br>TBS 5000 UL |
| Number of receive antennas | 2 Receive Antennas | 1 Receive Antenna | 1 Receive Antenna | 1 Receive Antenna |
| Bandwidth | Entire System Bandwidth | 1.4 MHz (not finalized) | 1.4 MHz | 1.4 MHz, 3 MHz in UL<br>Up to 10 MHz, 20 MHz in DL |
| Duplexer | Full Duplex + Half Duplex (4/8) | Half Duplex (3/8) | Half Duplex (3/8) | Half Duplex desirable (4/8): TTI-B |
| Power Amplifier | Power Class 3: 23dBm | Power Class 3: 23dBm | New Power Class Reduced Power output (20 dBm) | Power Class 3: 23dBm |
| Modulation | DL: QPSK, 16QAM, 64QAM<br>UL: QPSK, 16QAM | DL: QPSK, 16QAM, 64QAM<br>UL: QPSK, 16QAM | QPSK/16QAM | DL: QPSK, 16QAM<br>UL: QPSK, 16QAM/64QAM |
| Scenarios | Supports all use cases | Access Barring<br>No Real Time Applications | Access Barring<br>No Real Time Applications | Access to NW all times + VoLTE |

FIG. 6

Desirable    Not suitable    Suitable

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2702 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

1.4MHz

2MHz

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

3MHz

FIG. 7

DEVICE CATEGORY IN 3GPP COMMUNICATIONS

PRIORITY CLAIM

This application is a continuation of U.S. patent application Ser. No. 15/387,904 titled "New Device Category in 3GPP Communications", filed on Dec. 22, 2016, which itself claims benefit of priority of U.S. Provisional Patent Application Ser. No. 62/274,353 titled "New Device Category in 3GPP Communications", filed on Jan. 3, 2016, both of which are hereby incorporated by reference as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to a new category of devices in 3GPP wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc.

Various ones of the wireless communications standards, such as LTE, utilize packet switched networks. The LTE specification defines a number of User Equipment (UE) categories, where each LTE category defines the overall performance and the capabilities of a UE. These LTE categories define the standards to which a particular handset, dongle or other equipment will operate in the communication system. The LTE categories or UE classes are used to ensure that the base station (eNodeB or eNB) can communicate correctly with the user equipment. The UE relays the LTE UE category information to the base station, and thus the base station is able to determine the performance characteristics of the UE and communicate with the UE accordingly. This enables the eNB to communicate using capabilities that it knows the UE possesses. The LTE UE category information is therefore of great importance. While users may not be particularly aware of the category of their UE, the performance of the UE matches the UE's category and allows the eNB to communicate effectively with all the UEs that are connected to it. However, the eNB will be less likely to communicate beyond the performance of the UE corresponding to the category of the UE.

Accordingly, improvements in the field are desirable.

SUMMARY OF THE INVENTION

Embodiments are presented herein of, inter alia, methods for wireless communication devices communicating, e.g. with cellular base stations, according to a new device category, and of devices that implement the methods. Embodiments are further presented herein for wireless communication systems containing user equipment (UE) devices and base stations communicating with each other within the wireless communication systems.

In various embodiments, a UE device may communicate according to a new device category satisfying specified QoS requirements while also satisfying specified link budget requirements, and, in some embodiments, additional optimization requirements. The UE device may communicate with a cellular base station according to the new device category, and may switch to communicating with the cellular base station in a way that the UE uses physical channels and/or procedures that are specific to one or more other, different device categories. For example, the UE device may switch to using physical channels and/or procedures associated with a second (pre-existing) device category if the link budget requirements exceed a specified value and the QoS requirements are not sensitive, while communicating with the cellular base station. The UE device may also switch to using physical channels and/or procedures associated with a third (pre-existing) device type if either the link budget requirement does not exceed the specified value, or the QoS requirements are sensitive and a downlink throughput requirement exceeds a specified throughput value, while communicating with the cellular base station.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 shows a table of select device category definitions that include a newly proposed category A (Cat-A), according to some embodiments;

FIG. 7 shows an exemplary table illustrating uplink requirements for some wireless communications according to some embodiments;

Figure 1:
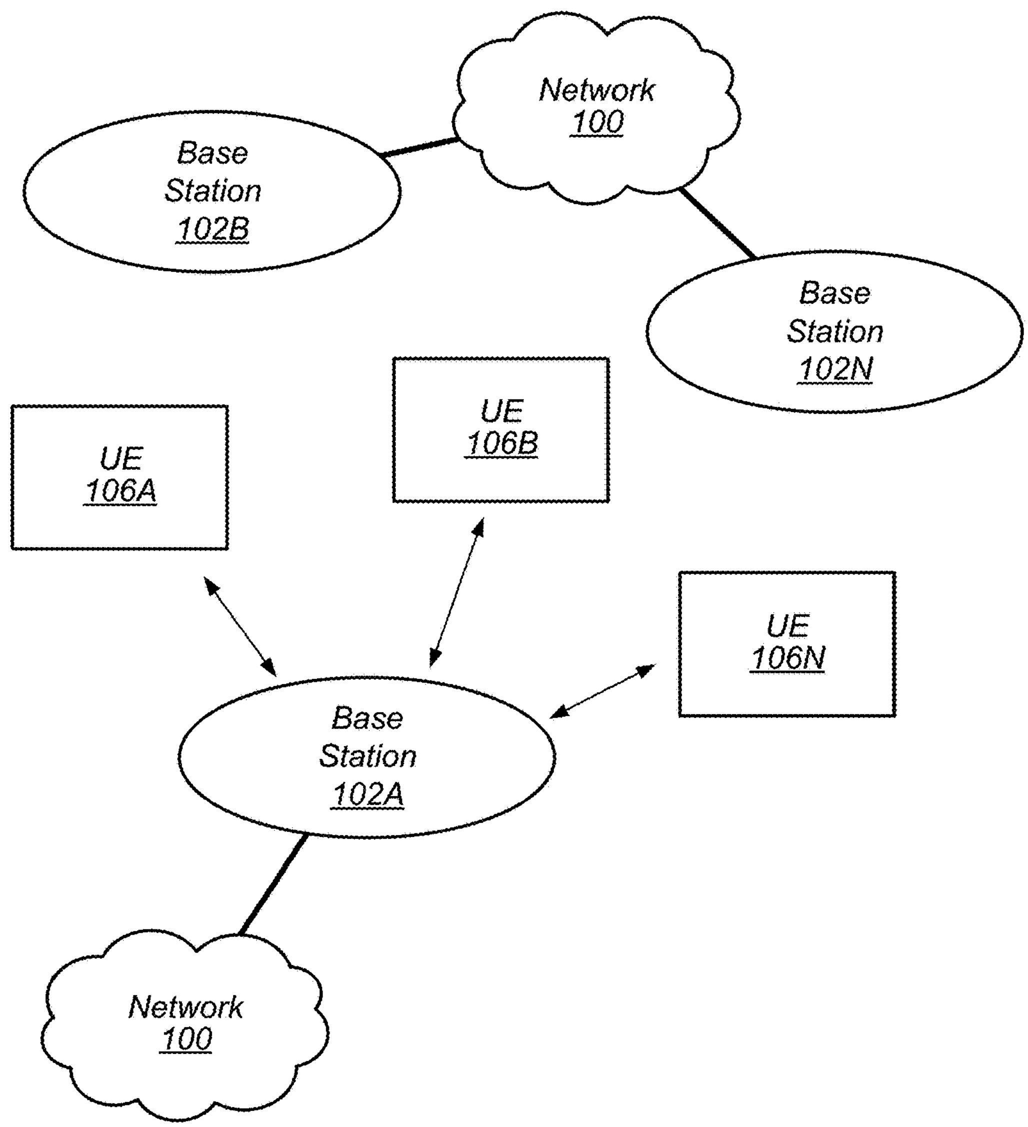
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

UE: User Equipment
RF: Radio Frequency
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission/Transmit
RX: Reception/Receive
UMTS: Universal Mobile Telecommunication System
LAN: Local Area Network
WLAN: Wireless LAN
AP: Access Point
APR: Applications Processor
APN: Access Point Name
GPRS: General Packet Radio Service
GTP: GPRS Tunneling Protocol
PDN: Packet Data Network
PGW: PDN Gateway
SGW: Serving Gateway
RAT: Radio Access Technology
Wi-Fi: Wireless Local Area Network (WLAN) RAT based on the Institute of Electrical and Electronics Engineers' (IEEE) 802.11 standards
PDCP: Packet Data Convergence Protocol
BSR: Buffer Size Report
CMR: Change Mode Request
TBS: Transport Block Size
ROHC: Robust Header Compression
SID: System Identification Number
PDU: Protocol Data Unit
PT: Payload Type
FT: Frame Type
AMR-WB: Adaptive Multi-Rate Wideband
RTP: Real-time Transport Protocol
IR: Initialization and Refresh state
FO: First-Order state
DYN: Dynamic

TERMS

The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™, Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
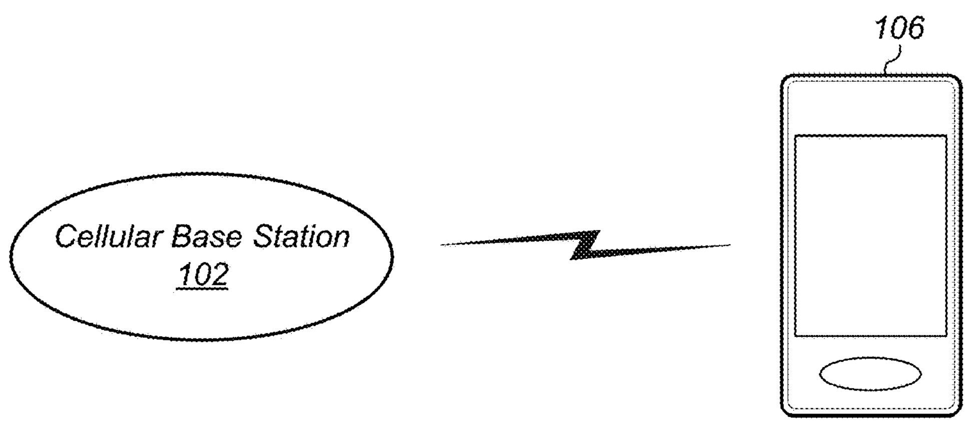
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate according to a new category [definition] as detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 at least according to a new and improved category designation/definition of UE 106 as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
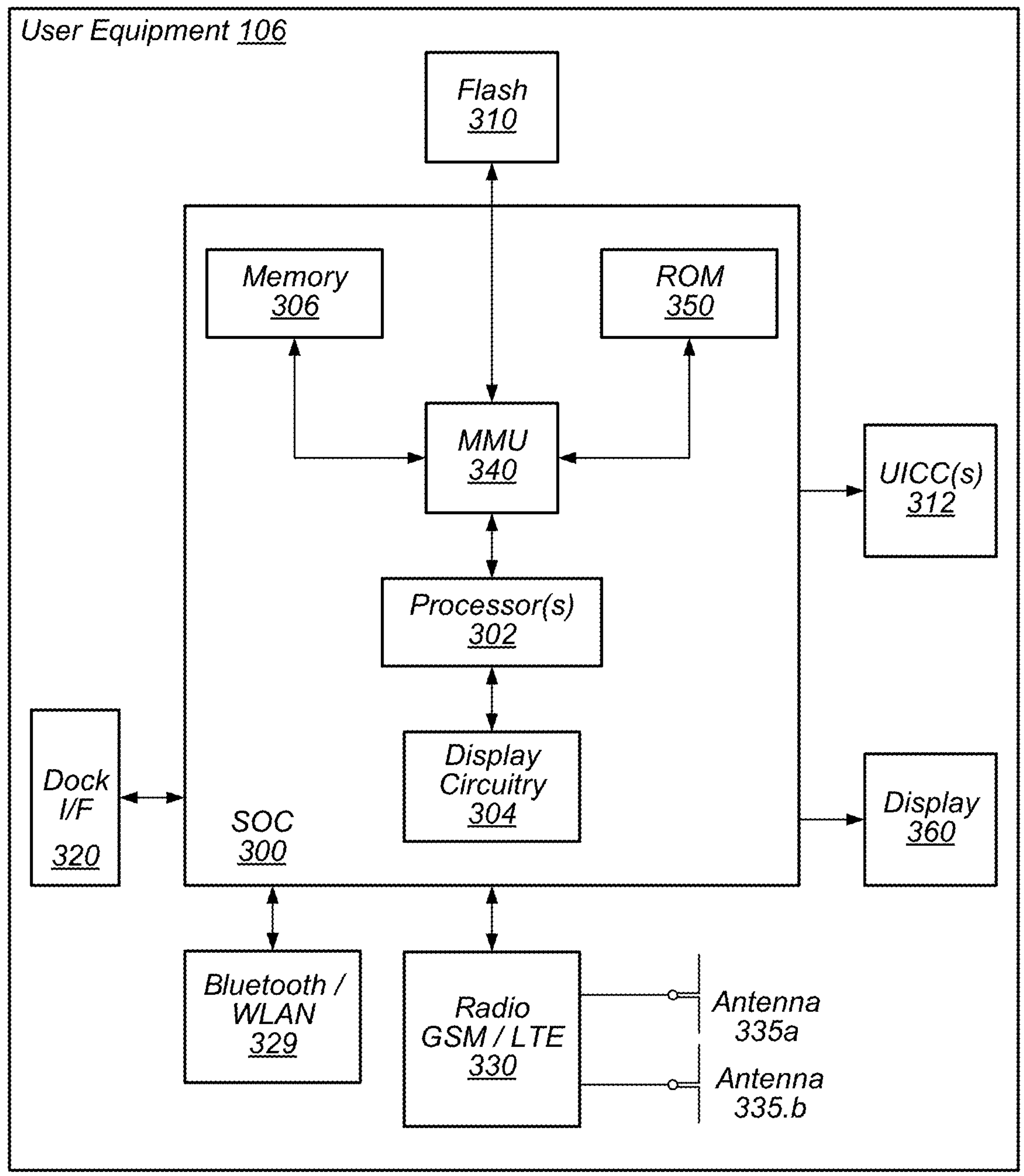
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for UE 106 [and base station 102] communicating [with each other] at least according to a new and improved category designation of UE 106. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporates communications corresponding to a new, improved category designation of UE 106 according to various embodiments disclosed herein. Specifically, processor(s) 302 may be coupled to and/or may interoperate with other components as shown in FIG. 3 to facilitate UE 106 communicating in an adaptive manner that seeks to optimize power consumption and performance during wireless communications of UE 106. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi Fi controller 350, a cellular controller (e.g. LTE controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302) as will be further described below. For example, Wi Fi controller 350 may communicate with cellular controller 352 over a cell-ISM link or WCI interface, and/or BLUETOOTH™ controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
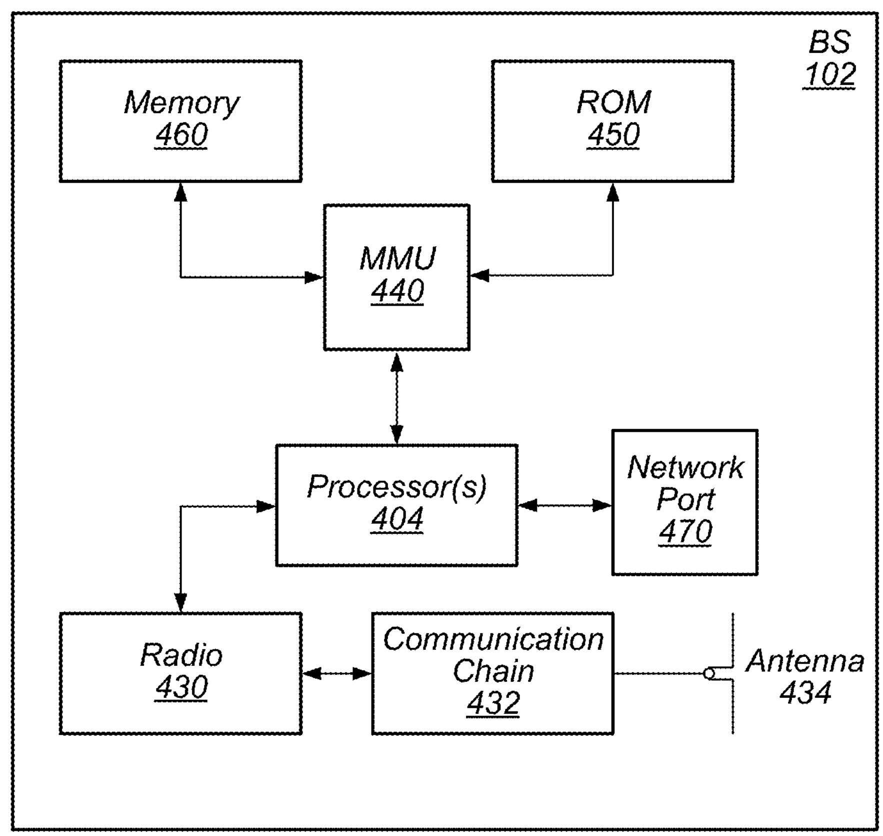
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor 404 of the base station 102 may be configured to implement part or all of the methods described herein for base station 102 to communicate with a UE device belonging to a new category of devices capable of adaptively improving power consumption, link budget management, and performance during wireless communications, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices of a wider range of device categories.

Device Categories

There are many different device category definitions for LTE devices. For example, categories 1-8 are designated for smartphones, and most phones operate according to one of categories 3 to 8. In other words, smartphones typically operate as a device belonging to one of categories 3-8. Category M (Cat-M) is typically used for MTC (Machine Type Communications) devices such as soda machines, smart meters, etc. In some embodiments, a new category A (Cat-A) may be devised and tailored to a specific group of devices, for example to wearable devices such as smart watches or smart glasses. In terms of functionality, wearable devices represent a compromise between link budget and quality of service (QoS). Thus, when considering current existing categories, it may be advantageous to retain the link budget improvement associated with Cat-M because of the form factor, while also retaining the QoS of smart phone categories. Typically, if a Cat-M device has to report its electricity usage to the network, there is no need for the device to transmit such a report during peak wireless network traffic hours such as between 9 AM and noon. Instead, the device may transmit the report during off-peak hours, e.g. 3 AM when there is little or no network traffic. It may be considered difficult for the network to access the device in the middle of the day. Moreover, Cat-M does not necessarily support real time applications. It would therefore be desirable to devise a new category satisfying QoS requirements along with an improved link budget (i.e. also satisfying certain link budget requirements), and potentially implementing additional desired optimizations.

FIG. 6 shows a table of select device category definitions that include a newly proposed category A (Cat-A), according to some embodiments. Each column (of columns 2-5) corresponds to a respective device category and includes parameter requirements/designations associated with each respective feature/designation represented in a corresponding row of column 1 (Features). A new category (Cat-A) in the fifth column may be defined—according to some embodiments—by the parameter requirements/designations that appear in column 5. That is, the parameter requirements/designations in the Cat-A column represent parameter requirements/designations associated with (or corresponding to) a newly defined category. In some embodiments, the respective corresponding parameter requirements of Cat-A may incorporate (at least in part) the maximum throughput requirements of CAT "1", the number of transmit antennas required in CAT "0" and CAT "M", the duplexer requirement of CAT "1", the power amplifier requirements of CAT "1" and CAT "0", and the modulation requirements of CAT "M". The table also highlights various different characteristics as desirable, unsuitable or suitable.

Cat-A Requirements for UL

The bandwidth (BW) requirement for UL may be based on the link budget limitation of the UE, whereby the potential gain of a large BW may be limited. The PUSCH may be limited to a specified (e.g. small) number of resource blocks (RBs), which may be 6 to 15/25 RBs in some embodiments. In order to achieve a specified (e.g. peak) throughput, which may be 5 Mbps (in full duplex mode) in some embodiments, at least a specified BW (e.g. at least 3 MHz) may be required. The modulation designations/schemes may include QPSK, 16QAM (for peak throughput definition). FIG. 7 shows an exemplary table illustrating UL designations according to some embodiments. The numbers in the top row indicate the number of physical resource blocks, while the first column in each table indicates the transport block size. For example, as shown in FIG. 7, no more than 15 RBs are to be used when operating at 3 MHz.

Figure 8:
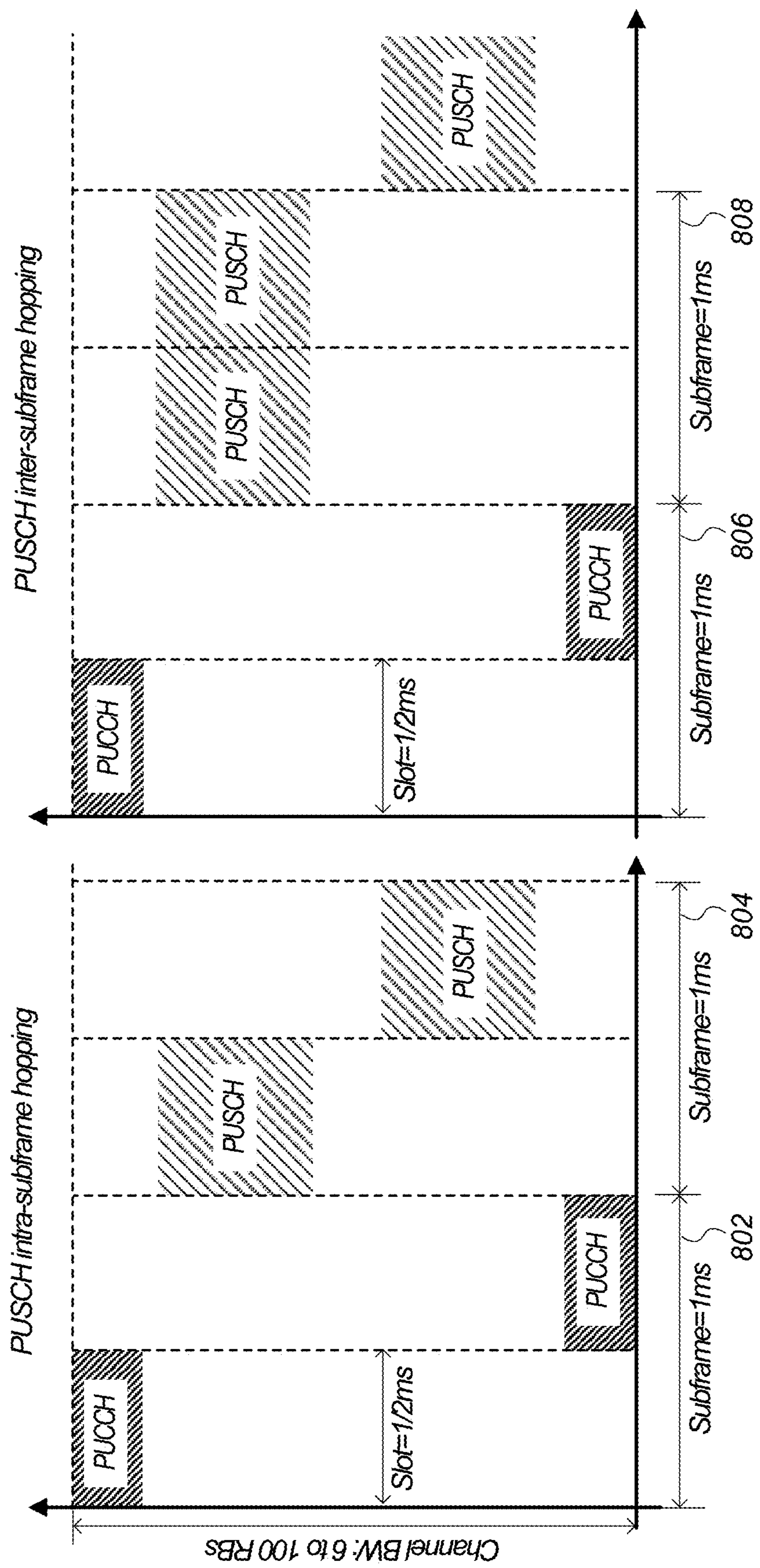
FIG. 8 illustrates the uplink narrow bandwidth operation of a wireless communication device, according to some embodiments.

The UL physical channels (PHY) may be characterized as follows. The PUCCH may be narrowband (e.g. 1 RB), located around the extreme end of the system bandwidth in the frequency domain. The PUSCH may be narrowband/wideband allocated by a E/M/PDCCH grant (e.g. an EPDCCH grant or M-PDCCH grant or PDCCH grant). The SRS may be narrowband and wideband. The PRACH may be narrowband, e.g. 6 RBs, based on an RRC configuration. FIG. 8 illustrates the overall operation of the UE in UL narrow BW according to some embodiments. As illustrated in FIG. 8, the UE may perform tuning across two subframes, e.g. subframes 802 and 804, and/or subframes 806 and 808, respectively. FIG. 8 illustrates tuning for PUSCH intra-subframe hopping and PUSCH inter-subframe hopping, respectively, across two subframes for each case.

Figure 9:
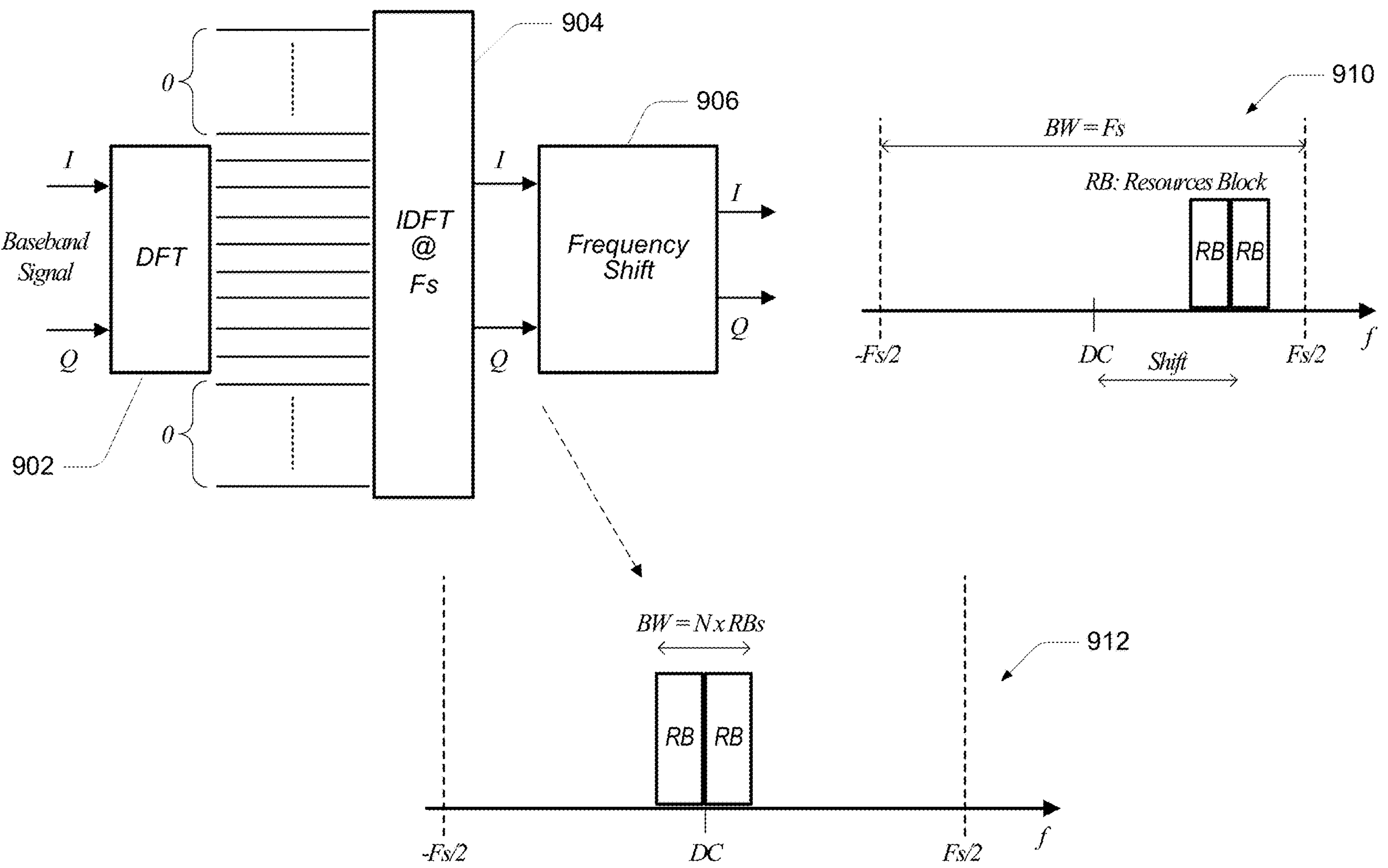
FIG. 9 illustrates the signal generation on the PUSCH during uplink narrow bandwidth operation of a wireless communication device, according to some embodiments.

FIG. 9 illustrates the signal generation on the PUSCH during UE narrow BW UL operation according to some embodiments. In the exemplary embodiment, the baseband signal is processed in a digital Fourier transform block (DFT 902) and the resulting output signals are provided to an inverse digital Fourier transform block (IDFT 904) operating at frequency Fs. The processed baseband signal is then frequency shifted (Frequency Shift block, or FSB 906). Diagram 912 illustrates the frequency spectrum of the signals entering FSB 906, and diagram 910 illustrates the frequency spectrum of the signals output from FSB 906.

Figure 10:
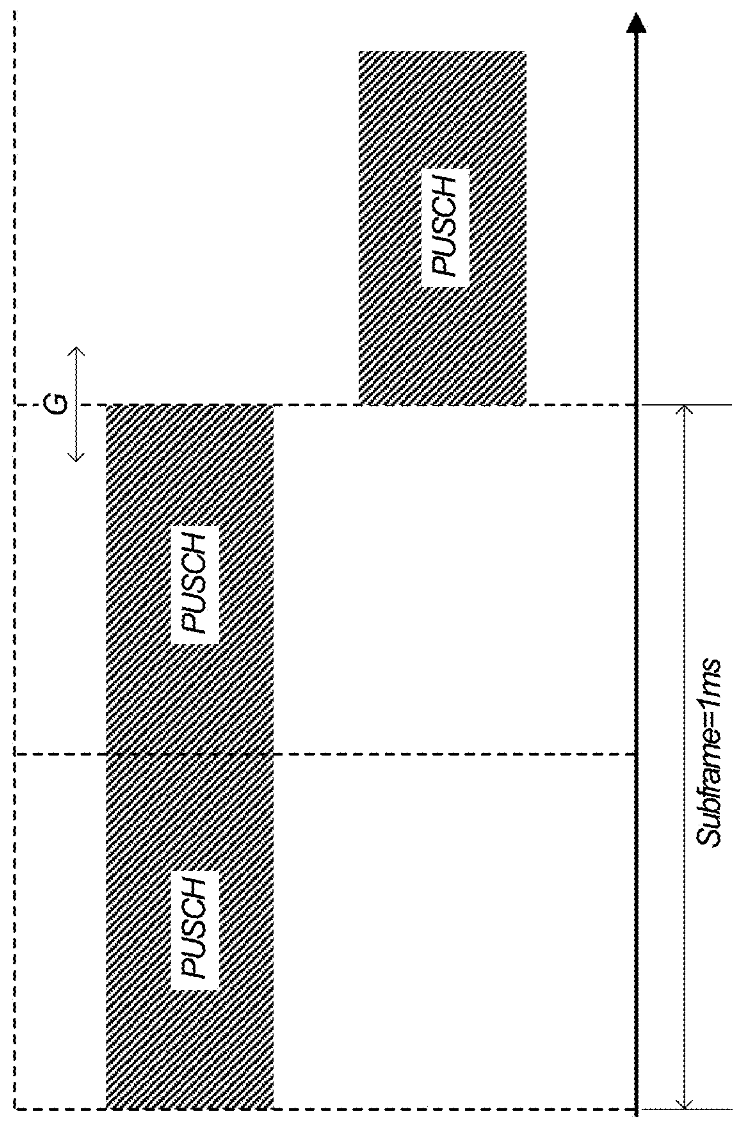
FIG. 10 illustrates an example of a tuning gap according to some embodiments.

Referring to FIG. 8 and FIG. 9, the operation of the UE in UL narrow BW may be partially characterized as follows. The System BW may be kept to the network configuration (e.g. 10/20 MHz), depending on the network deployment. The RF may be opened for the number of RBs needed (e.g. 1 RB for PUCCH, up to 15 RBs for PUSCH based on DCI0). The RF may be tunable to the location (in some embodiments to the exact location) of the frequency domain allocation. For example, the RF may be tuned to the location of the frequency domain allocation whenever frequency hopping is needed. The PLL may be designed to have at least a specified resolution such that tuning loss has negligible impact on performance and the tuning period is shared across a specified number of subframes, e.g. the tuning period may be shared across two subframes in this case. FIG. 10 illustrates an example of a tuning gap (denoted by "G" in the figure) according to some embodiments.

The UL narrowband "On" operation of the UE may include the following specifications.

- The UL grant allocation for PUSCH may be restricted, i.e. the present system BW may be retained. This may be performed through signaling to the NW for a new category definition. Prior to attaching to the NW and prior to the UE Identification in RRC signaling, the UE may operate in a different category mode, e.g. CAT-M mode. For example, in some embodiments, MSG3 (PUSCH) and PUCCH may be using a specified frequency, such as 1.4 MHz associated with (or corresponding to) CAT-M.
- SRS may be disabled, or only narrowband configuration may be allowed for SRS. Common SRS may be sent in SIB2, and UE-Specific SRS may be sent through RRC signaling (RRC connection reconfiguration). Accordingly, in some embodiments, the Cat-A device may disregard the configuration relayed through SIB2 and may instead use the configuration relayed through the RRC signaling that supports narrowband SRS for a Cat-A device. In some embodiments, a Cat-A device may be specified as not supporting the wideband SRS configuration in RRC, thereby differing from legacy UEs. In such embodiments, the eNB may not signal a wideband SRS configuration, rather a narrowband SRS may be implemented to support the narrowband mode of operation of the Cat-A device during UL operations.

Figure 11:
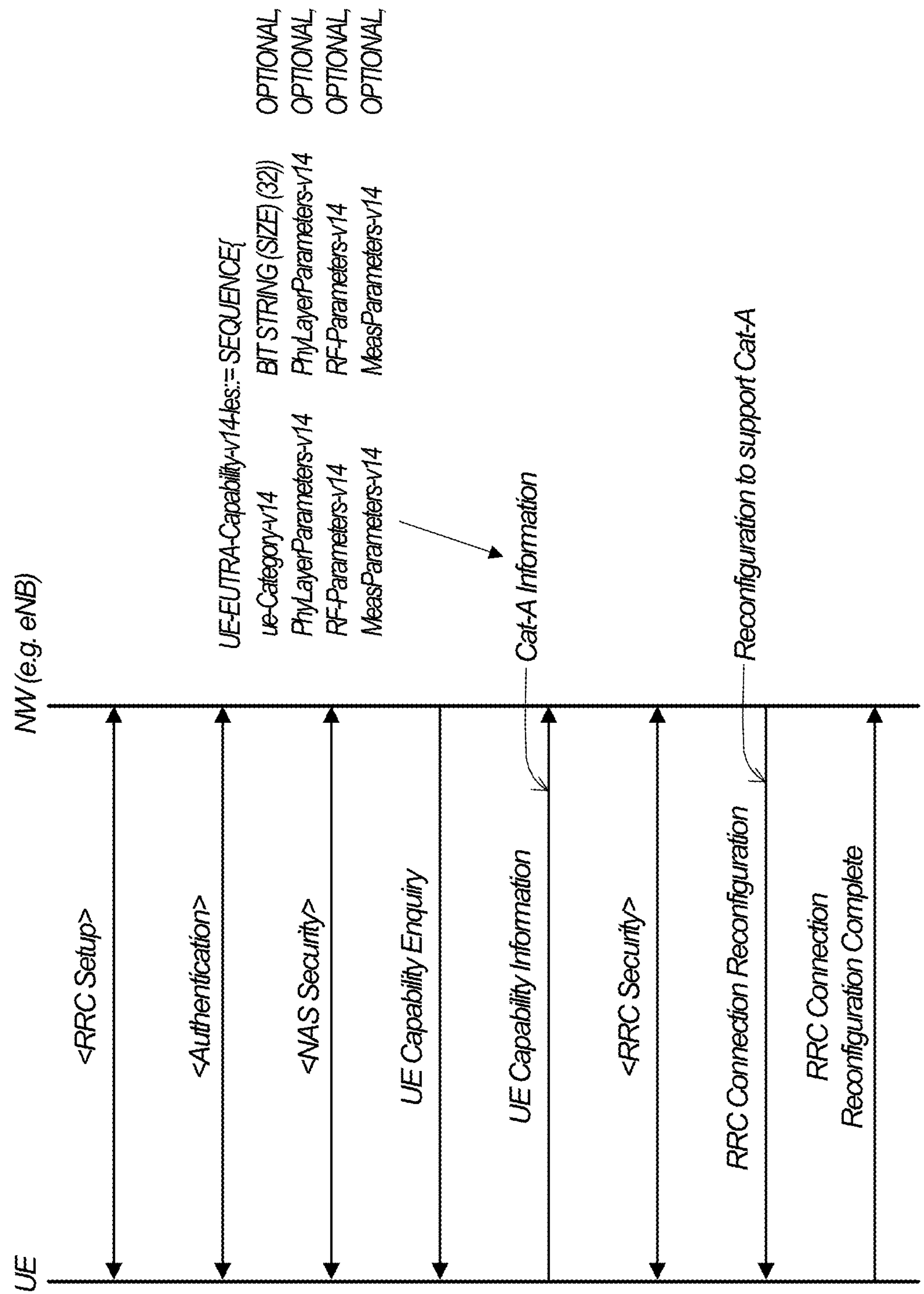
FIG. 11 shows a partial timing diagram illustrating signaling for a new category (Cat-A) device, according to some embodiments.

FIG. 11 shows a partial timing diagram illustrating signaling for a Cat-A device according to some embodiments. As illustrated in FIG. 11, once initial setup through RRC signaling has been established (RRC Setup, Authentication, NAS Security), the NW (e.g. base station or eNB) may query the UE for capability information (UE Capability Enquiry). The UE may respond (e.g. through RRC signaling for UE category or UE capability) indicating that it is a Cat-A device (UE Capability Information). In response, the RRC connection may be reconfigured to support Cat-A operation, as signaled in an RRC Connection Reconfiguration message, with acknowledgment sent to the eNB once the connection reconfiguration is complete.

Figure 12:
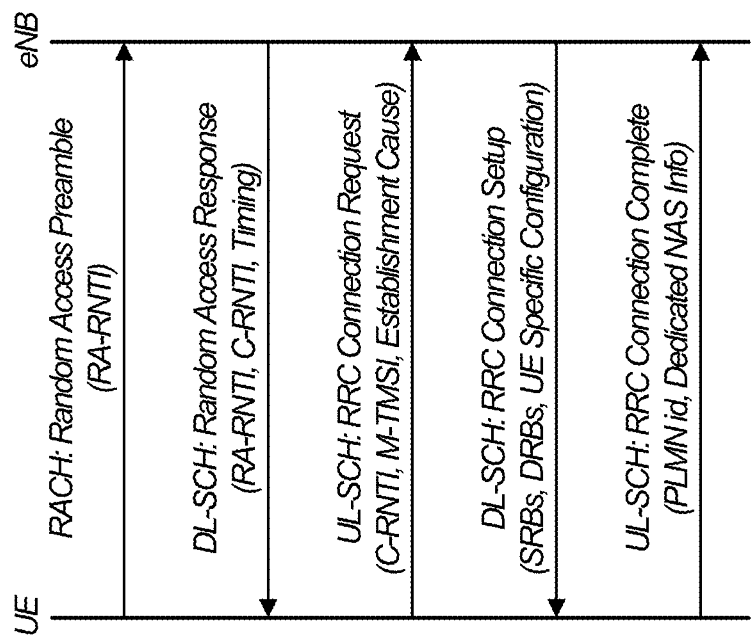
FIG. 12 shows a flow diagram illustrating signaling for a new category (Cat-A) device, according to some embodiments.

FIG. 12 shows a flow diagram illustrating signaling for a Cat-A device according to some embodiments. During the first phase of device Attach, the Cat-A UE may be identified during the RACH procedure as a Cat-M device, which may operate at a frequency appropriate for a Cat-M device, e.g. at 1.4 MHz. Alternatively, a new, reserved preamble may be defined for Cat-A devices, and the category [Cat-A] may be identified at the first message (@MSG1) during the RACH procedure for the Attach procedure. This may also lead to a change in the SIB, or the definition of a new SIB for Cat-A, in which case the eNB may ensure that PUSCH is restricted to up to a specified number of RB, e.g. 15 RBs, while PUCCH may be used according to legacy usage. Once the Attach procedure is complete and the NW is informed of the Cat-A capability of the UE, all subsequent RRC Connection Requests may be based on the new Cat-A. That is, PUSCH and PUCCH operations may proceed according to the Cat-A requirements (as previously defined above). For PRACH procedures, either the Cat-M RACH or the new PRACH for Cat-A may be used.

Cat-A Requirements for DL

The DL BW requirements may be different from the UL BW requirements for a Cat-A device.

The link budget may be improved by increasing the BW (more transmit power @eNB for more RBs). In some embodiments a specified frequency may be targeted, for example a 10 MHz target may be assumed. In order to achieve a desired [e.g. peak] throughput, e.g. 10 Mbps (in full duplex), in some embodiments a BW of at least a specified frequency, e.g. 3 MHz, may be designated. The modulation may be specified as QPSK, 16QAM, and 64QAM (for peak throughput definition).

The DL physical channels (PHY) may be characterized as follows. The PSS/SSS/MIB may be narrowband channels (e.g. 1.4 MHz) in the center of the bandwidth. The PHICH/PCFICH may be narrowband channels that may be bypassed or replaced by EPDCCH/M-PDCCH. The PDSCH may be based on eNB resource assignment. The PDCCH may be a wideband channel (which needs to be accounted for during narrowband mode of operation). The E-PDCCH may be a narrowband channel (e.g. 8 PRBs spread across the whole system bandwidth), and may be UE-specific, used in RRC connected mode.

Overall, the DL requirements may be considered different from the UL requirements, allowing for asymmetry between the UL and the DL BW assignment. UL operation is narrowband, and polar architecture would be a transmit architecture candidate for the transceiver to reduce power consumption. During DL operation the main advantage of narrowband is ADC, and a possible LOW IF (intermediate frequency) receiver. There may be a reduced benefit associated with using narrowband in the DL operation compared to the UL operation. In DL operation, the more RBs are used the more transmit power is required from the eNB. The desired frequency band may be thought of in terms of energy efficiency during the DL operation (e.g. 10 MHz may be desirable). By way of example, a desired payload may be a payload with a throughput of 5 Mbps (megabits per second). Cat-M supports 1 Mbps, whereby the transceiver remains awake operating at a data rate of 1 Mbps over 1.4 MHz. However, using 6 RBs at 1.4 MHz over 10 TTIs (transmit time intervals), for example, may achieve the same throughput as using 12 RBs over five TTIs. In terms of network usage both scenarios may be considered equal. Referring again to the example above, the use of 6 RBs over 10 ms may be considered the equivalent of the use of 12 RBs over 5 ms. However, from the perspective of energy efficiency, a scenario of 12 RBs over 5 ms may be more desirable because after 5 ms the transceiver may be switched off, resulting in power savings. For this reason, there may be no need to meet the bandwidth requirements of Cat-M during DL operations.

PDCCH Replacement for Cat-A

One limitation during DL operations is the control channel, PDCCH. E-PDCCH is UE-specific and is used in RRC connection mode and cannot be used for common channels like paging, SIB, RACH, etc. PDCCH may be replaced for Cat-A devices according to at least two different solutions. In a first solution, the E-PDCCH may be extended to be used for idle mode and common channels, SIB/RAR/Paging. This may require significant changes and may impact legacy UEs, especially for SIBs. For RAR and Paging it may include a definition of new reserved preambles for RACH, and a new UE_ID for paging for this new category (Cat-A) devices.

In a second solution, the M-PDCCH may be reused for RAR/Paging and MTC_SIB may be used (where MTC stands for machine-type communications), while E-PDCCH may be used for UE-specific data or a modified version of M-PDCCH to support a larger number of RBs (more than 6 RBs of Cat-M). It should be noted that MTC_SIB does not require a PDCCH. Consequently, RAR and Paging may be operating at a specified frequency (e.g. 1.4 MHz) like a Cat-M device. Before RRC connection reconfiguration is reached, M-PDCCH may be used. Once RRC connection reconfiguration has been reached, a complete switch to E-PDCCH may take place since E-PDCCH in the specification is UE specific and used only in RRC connected mode (or, as stated above, a modified version of M-PDCCH). Thus, to use E-PDCCH, a configuration is expected from the network, and that configuration may be received in an RRC connection reconfiguration transmission.

Furthermore, MTC_SIB may be made to cover all legacy SIBs. Since an MTC device may not support mobility, SIB4/5 may most likely not be redefined for MTC. Hence for Cat-A, new SIBs 4/5/10/11/12 may be created. SIBs 4 and 5 may be for mobility, SIBs 11 and 12 may be for emergency calls as the new category supports emergency calls. Overall, the new SIBs may be created to operate without PDCCH, i.e. they may operate without using PDCCH as MTC_SIB. The PRBs pairs used for E-PDCCH may be restricted to fit a specified bandwidth, which is 10 MHz in some embodiments. Prior to attaching to the NW, the UE may be operating using physical channels and/or procedures associated with a different category mode, e.g. Cat-M mode, while the UE may still be identified as a Cat-A device. In other words, the UE may not be identified as Cat-M device, but at the same time the UE may use M-PDCCH and common channels (SIB/RACH/Paging) as defined for (associated with) Cat-M because M-PDCCH and the above referenced common channels support a narrowband mode of operation (1.4 MHz). An example code sequence corresponding to E-PDCCH configuration is shown below:

```
EPDCCH-SetConfig-r11 ::= SEQUENCE {
setConfigId-r11 EPDCCH-SetConfigId-r11,
transmissionType-r11 ENUMERATED {localised, distributed},
resourceBlockAssignment-r11 SEQUENCE{
numberPRB-Pairs-r11 ENUMERATED {n2, n4, n8},
resourceBlockAssignment-r11 BIT STRING (SIZE(4..38)) //
This may be restricted to fit
in 10 MHz
},
```

DL Mode of Operation

Considering the new category (Cat-A), if the benefit of narrowband mode of operation is not justified, then in DL mode the UE may operate according to a legacy Cat-1 mode of operation all the while remaining identified as a Cat-A device. In other words, if there is no need for a narrowband mode of operation in DL, then a Cat-A device may simply operate according to certain features, e.g. certain channels and/or mode of operation associated with a different device category, e.g. operate according to certain features and procedures associated with a legacy Cat-1 device during DL communications/operations. For link budget enhancement, CE (coverage enhancements) from a different category, e.g. Cat-M may be reused for operation if desired. Overall, Cat-M operation may be used for all the common channels while UE-specific data may be handled according to Cat-A requirements (for a Cat-A UE). Thus, a Cat-A device may also have modes of operation associated with other device categories. In some embodiments, a Cat-A device may have Cat-1 and/or Cat-M modes of operation, which means that the Cat-A UE may use some PHY channels and/or procedures that are specific to (associated with) those different categories. For example, Cat-1 mode of operation means use of PDCCH, Cat-M mode of operation means use of M-PDCCH and narrowband (1.4 MHz) operation. It should be noted that the modes of operation described above are also referred to herein as "operating according to a different device category". For example, when a (Cat-A) UE device is said to be operating according to Cat-1, it means that the Cat-A UE device uses some channels and/or procedures that are specific to Cat-1, while the UE device remains identified as a Cat-A device.

It should be noted that UL communications may always take place in a narrowband mode of operation. For example, during UL operations the UE may operate in at most (i.e. maximum) a 3 MHz bandwidth. During DL communications, the UE may operate in a 10 MHz bandwidth independently of the system bandwidth, or the UE may operate in the system bandwidth. Furthermore, in some embodiments, a Cat-A device may always operate in asymmetric bandwidths for UL and DL operations. In other words, in some embodiments, a Cat-A device may operate in a first size bandwidth for DL operations and a second size bandwidth for UL operations, where the first size bandwidth differs from the second size bandwidth.

Consequently, if a narrowband mode of operation in DL is justified by the architecture, then a Cat-A device may operate in a specified system band for efficiency, e.g. in 10 MHz for energy efficiency (it should be noted that operating in a 1.4 MHz band has an impact on power consumption for heavy DL traffic). For link budget enhancement and common channels, a Cat-A UE may operate using features, channels and/or procedures specific to a Cat-M device (i.e. operate in a 1.4 MHz bandwidth). In a way, during some time periods the UE may be said to switch from operating as a Cat-A device to operating as a Cat-M device. However, as mentioned above, this doesn't mean that the UE changes its category or that the category of the UE is redefined/modified. In some embodiments, this change in mode of operation includes changing the mode of operation for the PHY channels and the system bandwidth. For example, if link budget enhancements are needed, the UE may operate in 1.4 MHz and use the M-PDCCH as a Cat-M device would, but the UE still remains a Cat-A device.

Figure 13:
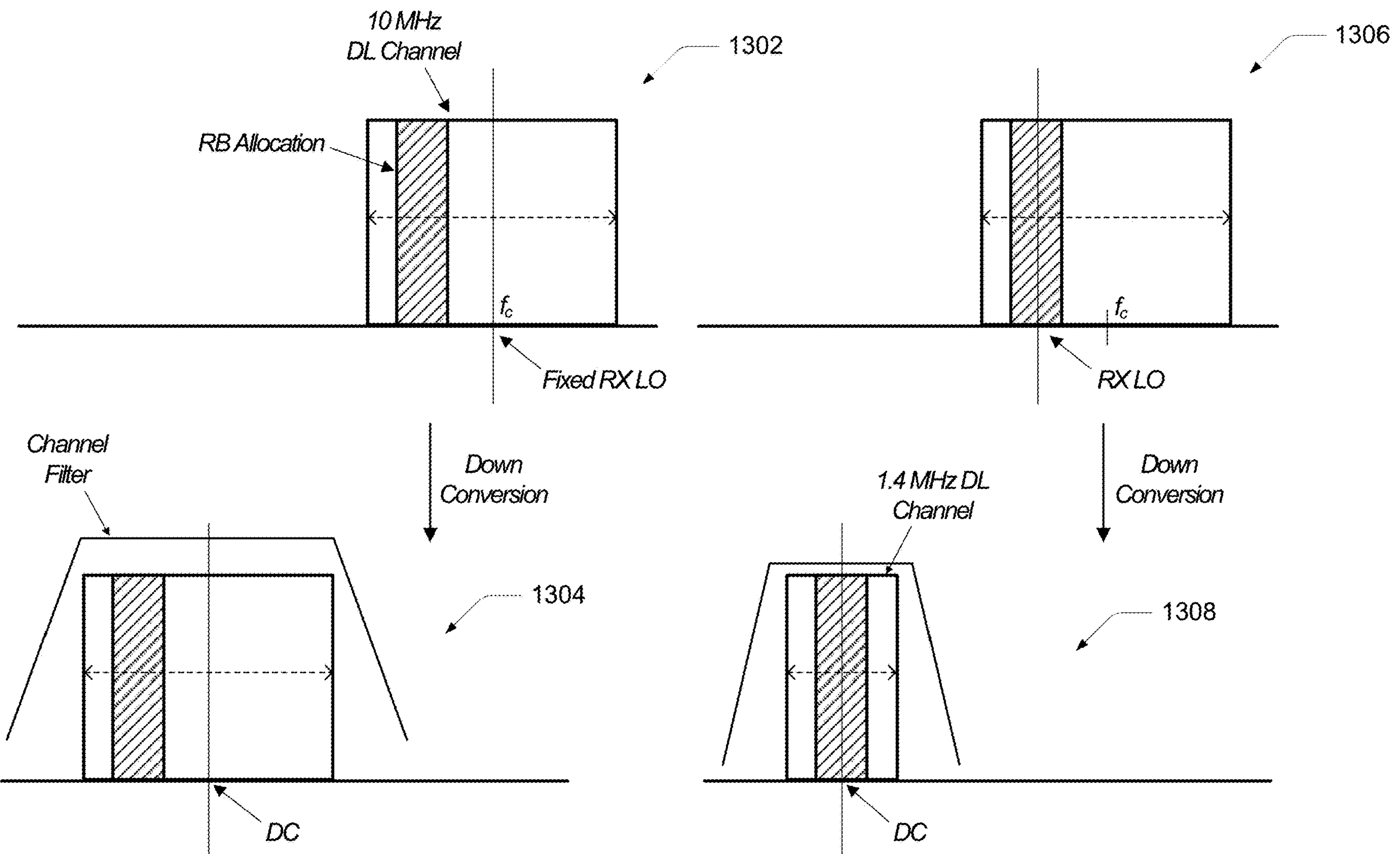
FIG. 13 shows an exemplary frequency spectrum diagram illustrating the downlink mode of operation of a new category (Cat-A) device, according to some embodiments.

FIG. 13 shows an exemplary frequency spectrum diagram illustrating the DL mode of operation of a Cat-A device according to some embodiments. Diagram 1302 illustrates the frequency spectrum when a fixed receive local oscillator (Fixed RX LO) is used, and the resulting baseband signal frequency spectrum is illustrated in diagram 1304. Diagram 1306 illustrates the frequency spectrum when an RX LO offset from the center frequency is used, and the resulting baseband signal frequency spectrum is illustrated in diagram 1308.

Defining Cat-A in Terms of Cat-1

In some embodiments, Cat-A may be defined in terms of Cat-1 with narrowband operation in UL/DL. That is, a Cat-A device may be considered as a Cat-1 device with a single receive (RX) antenna, reuse of Cat-M agreements for common channels (RAR/Paging/SIB) and extensions if needed, and use of Cat-M mode (i.e. M-PDCCH, time domain repetitions and 1.4 MHz) in idle mode and during attach procedure (e.g. refer to FIG. 6 showing overlapping features between various device categories according to some embodiments). For UL, if new RACH preambles are introduced in Cat-A, the PUCCH may differ, while in Cat-M, PUCCH is restricted to 1.4 MHz whereas Cat-A operates according to legacy PUCCH.

As soon as RRC connection reconfiguration is complete, the UE may be operating as a fully Cat-A device, i.e. it may use E-PDCCH for UE-specific data, and operate in 10 MHz in DL mode, and in 3 MHz in UL mode. For a link budget improvement higher than 5 dB and QoS requirements that are not sensitive, the UE may switch to a Cat-M mode of operation as previously described (in other words, the UE may remain a Cat-A device while using a mode of operation specific to or associated with Cat-M), i.e. operating in a 1.4 MHz band with time domain repetitions. For a link budget improvement lower than 5 dB, the UE may switch to a Cat-1 mode of operation. For QCI1 (e.g. real time applications, VoLTE or similar QoS, QoS that are sensitive for e.g. real time applications)/Heavy DL throughput and regardless of the link budget improvement needed (i.e. be it more than 5 dB or less than 5 dB), the UE may again switch to a Cat-1 mode of operation.

The switch from operating according to a mode of operation associated with one category to operating according to a mode of operation associated with another category may be performed at the eNB through RRC signaling. The UE may be identified as a Cat-A device, but based on the link budget, the QoS and/or the throughput/power consumption requirements, the eNB may enable the most appropriate (or most advantageous) mode of operation (e.g. PHY channels like M-PDCCH, 1.4 MHz mode of operation, E-PDCCH, common channels procedures, etc.) The switch may be requested by the wireless communication device (e.g. in form of MAC CE/RRC signaling) or it may be triggered by the NW based on measurements available at the NW (e.g. RSRP/CQI/PHR/BSR/BLER, etc.) It should also be noted that while there are at least three modes of operation of a Cat-A device disclosed herein, operation of Cat-A devices is not restricted to the examples provided herein. For example, in some embodiments, when certain conditions are met a Cat-A device may operate according to procedures and/or use of channels associated with other device categories not specifically mentioned herein, in addition to Cat-1 and Cat-M modes of operation. Furthermore, a Cat-A device may operate according to the requirements specified for a Cat-A device (see FIG. 6 for exemplary category requirements for Cat-A) at all times, while under certain conditions—as also previously disclosed herein—the device may switch between performing respective operations according to corresponding procedures and/or use of channels associated with different categories.

Figure 5:
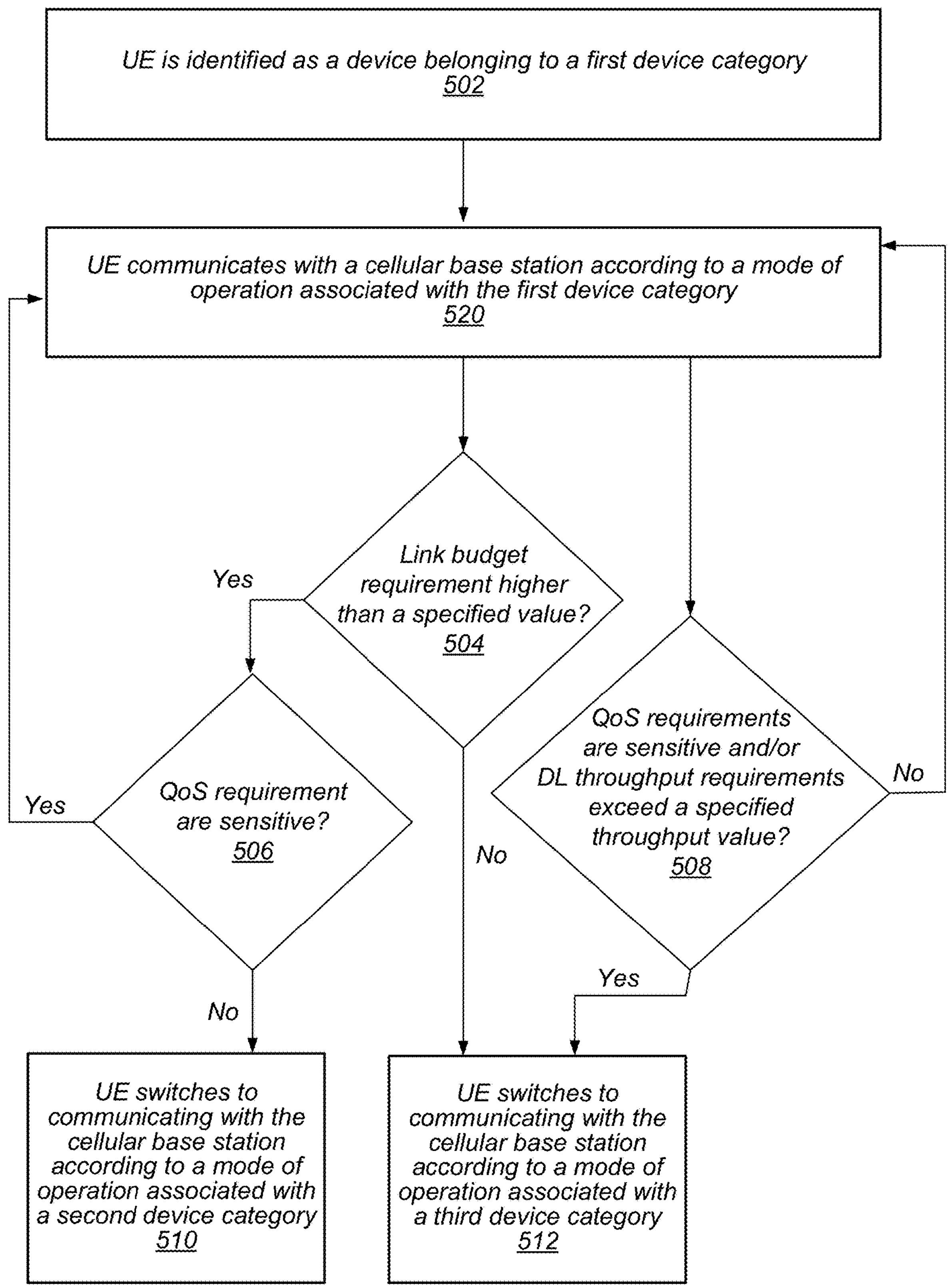
FIG. 5 shows an exemplary flow diagram illustrating communication between a UE device and a base station, according to some embodiments.

FIG. 5 shows a flow diagram illustrating communications between a UE device and a cellular base station according to some embodiments. The UE device may be identified as belonging to a first device category, which may be a new device category (or type) such as Cat-A, for example, as disclosed above (502). The UE device may communicate with a cellular base station according to a mode of operation associated with (or specific to) the first device category (520). If the link budget requirement exceeds a specified value (504) and the QoS requirements are not sensitive, i.e. the QoS requirements don't meet certain criteria (506), the UE may switch to communicating with the cellular base station according to a mode of operation associated with a second device category, e.g. associated with a pre-existing device category such as Cat-M in some embodiments (510). If the link budget requirement does not exceed the specified value (504), the UE may switch to communicating with the cellular base station according to a mode of operation associated with a third device category, e.g. associated with another pre-existing device category such as Cat-1 in some embodiments (512). Furthermore, if the QoS requirements are sensitive, i.e. they meet certain criteria, and/or downlink throughput requirements exceed a specified throughput value (508), the UE may switch to communicating with the cellular base station according to the mode of operation associated with the third device category (512).

Various Embodiments

In some embodiments, a wireless communication device (UE) may perform communications with a cellular base station according to a mode of operation associated with a first UE category, whereby the first UE category includes communication parameter values corresponding to communication parameters that at least partially define how the UE communicates with the cellular base station. The communication parameter values may define a first maximum transport block size for downlink communications and a second maximum transport block size for uplink communications, where the first maximum transport block size is different from the second maximum transport block size. The communication parameter values may also define a first bandwidth for the uplink communications and a second bandwidth for the downlink communications, where the first bandwidth is different from the second bandwidth.

In some implementations, the first transport block size is 10000 and the second transport block size is 5000. Furthermore, the first bandwidth may be 1.4 MHz or 3 MHz, and the second bandwidth may be up to one 10 MHz or 20 MHz. During communications taking place according to the first UE category, a Physical Uplink Shared Channel (PUSCH) may be limited to a specified number of resource blocks. In addition, during communications taking place according to the first UE category, a Physical Uplink Control Channel (PUCCH) may be a narrowband channel located around an extreme end of a communications bandwidth of the UE in the frequency domain.

In some embodiments, an apparatus may include a processing element that can cause a wireless communication device (UE) to perform, during a first period of time, communications with a cellular base station according to a mode of operation associated with a first device category, where the first device category includes a first set of communication parameter values corresponding to communication parameters that at least partially define how the wireless communication device communicates with the cellular base station. The processing element may also cause the UE to perform, during a second period of time, communications with the cellular base station according to a mode of operation associated with a second device category, where the second device category includes a second set of communication parameter values corresponding to the communication parameters. During the first period of time, the UE may perform uplink communications and during the second period of time the UE may perform downlink communications.

Furthermore, the processing element may also cause the UE to communicate at least a subset of the first set of communication parameter values to the cellular base station in response to receiving a wireless communication device capability enquiry from the cellular base station. In addition, the processing element may further cause the UE to receive a reconfiguration message from the cellular base station, where the reconfiguration message instructs the UE to operate according to the first device category.

In yet other embodiments, an apparatus may include at least a processing element that may cause a UE to communicate with a cellular base station according to a first mode of operation associated with a first device category, and to switch to communicating with the cellular base station according to a second mode of operation associated with a second device category in response to a link budget requirement being higher than a specified value and quality of service (QoS) requirements not being sensitive. The UE may also switch to communicating with the cellular base station according to a third mode of operation associated with a third device category in response to the link budget requirement not being higher than the specified value or QoS requirements being sensitive and/or a downlink throughput requirement exceeding a specified throughput value regardless of the link budget requirement. The UE switching from operating according to the first mode of operation to operating according to one of the second mode of operation or the third mode of operation may be facilitated by the cellular base station in response to a control signaling request received from the wireless communication device and/or in response to measurements available at the cellular base station.

FURTHER EMBODIMENTS

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:

a processor configured to cause a device to:

perform random access channel (RACH) communications with a cellular base station according to a procedure associated with a device of a first device category, wherein the procedure includes receiving a narrowband downlink physical control channel for signaling a random access response and narrowband mode of operation;

identify the device to the cellular base station as a device of a second device category different from the first device category subsequent to receiving the narrowband downlink physical control channel; and communicate with the cellular base station as the device of the second device category at least in response to having identified the device to the base station as a device of the second device category, wherein the second device category features one or mare of:

a greater maximum uplink bandwidth than the narrowband mode of operation associated with the first device category; or a greater maximum downlink bandwidth than the narrowband mode of operation associated with the first device category;

wherein the first device category and the second device category share at least one common parameter value that at least partially defines how the device communicates with the cellular base station; and wherein a maximum transport block size restriction of the second device category is greater than a maximum transport block size restriction of the first device category for unlink and downlink.

2. The apparatus of claim 1, wherein the processor is configured to cause the device to:

identify the device to the cellular base station as a device of the second device category by transmitting device capability information to the cellular base station.

3. The apparatus of claim 1, wherein the processor is configured to cause the device to:

receive radio resource control (RRC) connection reconfiguration information from the cellular base station in response to identifying the device to the cellular base station as a device of the second device category.

4. The apparatus of claim 3 wherein the processor is configured to cause the device to:

communicate with the cellular base station according to the one or more parameter values.

5. The apparatus of claim 3, wherein the RRC connection reconfiguration information includes one or more parameter values of the second device category, wherein the one or more parameter values at least partially define how the device communicates with the cellular base station.

6. The apparatus of claim 1, wherein the first device category is associated with a 1.4 MHz bandwidth and link budget limited devices.

7. The apparatus of claim 1, wherein the procedure is a network attach procedure.

8. A device comprising:

radio circuitry configured to facilitate wireless communications of the device; and a processor coupled to the radio circuitry and configured to interoperate with the radio circuitry to cause the device to:

perform random access channel (RACH) communications with a cellular base station according to a procedure associated with a device of a first device category, wherein the procedure includes receiving a narrowband downlink physical control channel for signaling a random access response and narrowband mode of operation;

identify the device to the cellular base station as a device of a second device category different from the first device category subsequent to receiving the narrowband downlink physical control channel; and communicate with the cellular base station as the device of the second device category at least in response to having identified the device to the base station as a device of the second device category, wherein the second device category features one or more of:

a greater maximum uplink bandwidth than the narrowband mode of operation associated with the first device category; or a greater maximum downlink bandwidth than the narrowband mode of operation associated with the first device category;

wherein the first device category and the second device category share at least one common parameter value that at least partially defines how the device communicates with the cellular base station; and wherein a maximum transport block size restriction of the second device category is greater than a maximum transport block size restriction of the first device category for unlink and downlink.

9. The device of claim 8, wherein the processor is configured to cause the device to:

identify the device to the cellular base station as a device of the second device category by transmitting device capability information to the cellular base station.

10. The device of claim 8, wherein the processor is configured to cause the device to:

receive radio resource control (RRC) connection reconfiguration information from the cellular base station in response to identifying the device to the cellular base station as a device of the second device category, wherein the RRC connection reconfiguration information includes one or more parameter values of the second device category, wherein the one or more parameter values at least partially define how the device communicates with the cellular base station.

11. The device of claim 8, wherein the processor is configured to cause the device to communicate with the cellular base station according to the one or more parameter values.

12. The device of claim 8, wherein the first device category is associated with a 1.4 MHz bandwidth and link budget limited devices.

13. The device of claim 8, wherein the procedure is a network attach procedure.

14. A non-transitory memory element storing instructions executable by a processor to cause a device to:

perform random access channel (RACH) communications with a cellular base station according to a procedure associated with a device of a first device category, wherein the procedure includes receiving a narrowband downlink physical control channel for signaling a random access response and narrowband mode of operation;

identify the device to the cellular base station as a device of a second device category different from the first device category subsequent to receiving the narrowband downlink physical control channel; and communicate with the cellular base station as the device of the second device category at least in response to having identified the device to the base station as a device of the second device category, wherein the second device category features one or more of:

a greater maximum uplink bandwidth than the narrowband mode of operation associated with the first device category; or a greater maximum downlink bandwidth than the narrowband mode of operation associated with the first device category;

wherein the first device category and the second device category share at least one common parameter value that at least partially defines how the device communicates with the cellular base station; and wherein a maximum transport block size restriction of the second device category is greater than a maximum transport block size restriction of the first device category for unlink and downlink.

15. The non-transitory memory element of claim 14, wherein the instructions are executable by the processor to cause a device to:

identify the device to the cellular base station as a device of the second device category by transmitting device capability information to the cellular base station.

16. The non-transitory memory element of claim 10, wherein the instructions are executable by the processor to cause a device to:

receive radio resource control (RRC) connection reconfiguration information from the cellular base station in response to identifying the device to the cellular base station as a device of the second device category.

17. The non-transitory memory element of claim 16, wherein the instructions are executable by the processor to cause a device to:

communicate with the cellular base station according to the one or more parameter values.

18. The non-transitory memory element of claim 16, wherein the RRC connection reconfiguration information includes one or more parameter values of the second device category, wherein the one or more parameter values at least partially define how the device communicates with the cellular base station.

19. The non-transitory memory element of claim 14, wherein the first device category is associated with a 1.4 MHz bandwidth and link budget limited devices.

20. The non-transitory memory element of claim 14, wherein the procedure is a network attach procedure.

* * * * *

UNITED STATES PATENT AND TRADEMARK OFFICE

CERTIFICATE OF CORRECTION

PATENT NO. : 11,317,324 B2
APPLICATION NO. : 16/590866
DATED : April 26, 2022
INVENTOR(S) : Tarik Tabet et al.

It is certified that error appears in the above-identified patent and that said Letters Patent is hereby corrected as shown below:

In the Claims

Column 19, Line 29, Claim 1 delete “mare” and substitute --more--.

Column 19, Line 43, Claim 1 delete “unlink” and substitute --uplink--.

Column 20, Line 38, Claim 8 delete “unlink” and substitute --uplink--.

Column 21, Line 29, Claim 14 delete “unlink” and substitute --uplink--.

Signed and Sealed this
Twenty-seventh Day of June, 2023

Katherine Kelly Vidal

Katherine Kelly Vidal
*Director of the United States Patent and Trademark Office*